United States Patent [19]
Rich

[11] 3,829,115
[45] Aug. 13, 1974

[54] FRAME ASSEMBLY FOR MOBILE STRUCTURES

[76] Inventor: Scott Rayfield Rich, Rt. 1, Carmichaels, Pa. 15320

[22] Filed: Aug. 24, 1972

[21] Appl. No.: 283,269

Related U.S. Application Data

[63] Continuation of Ser. No. 35,764, May 8, 1970, abandoned.

[52] U.S. Cl............................ 280/34 A, 280/491 R
[51] Int. Cl............................................. B62d 21/14
[58] Field of Search.......... 280/34 R, 34 A, 35, 415, 280/423, 491 R; 5/184, 185

[56] References Cited
UNITED STATES PATENTS

| | | | |
|---|---|---|---|
| 1,087,827 | 2/1914 | Pussinen | 5/184 |
| 2,834,599 | 5/1958 | Sarchet | 280/34 A |
| 3,330,574 | 7/1967 | Kulyk | 280/34 A |
| 3,356,381 | 12/1967 | Rich | 280/415 |
| 3,501,169 | 3/1970 | Nutt | 280/491 R |

*Primary Examiner*—Philip Goodman
*Assistant Examiner*—John A. Carroll
*Attorney, Agent, or Firm*—Shoemaker and Mattare

[57] ABSTRACT

This invention relates to a frame assembly for mobile structures wherein the frame may be readily attached to the mobile structure for transporting the structure and may be readily removed therefrom when the structure has been transported to its destination. The frame assembly has a first, extended position for transporting the mobile structure and a second, collapsed position for transporting the frame assembly when it is removed from the mobile structure. The frame assembly includes a unique suspension assembly which may be pivoted into and out of operative position on a supporting surface on which the structure is being transported or may be removed from the frame assembly.

16 Claims, 9 Drawing Figures

PATENTED AUG 13 1974　　　　　　　　　3,829,115

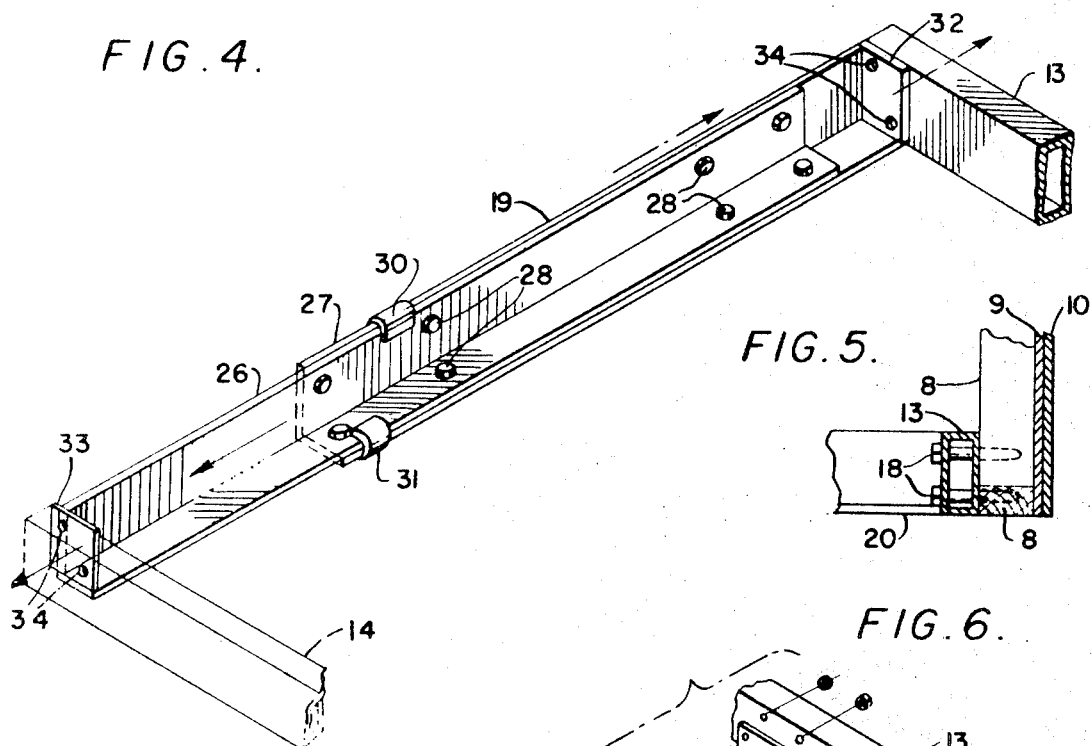
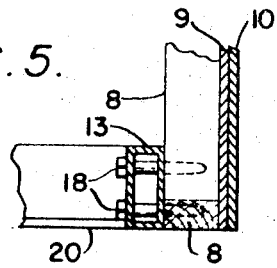
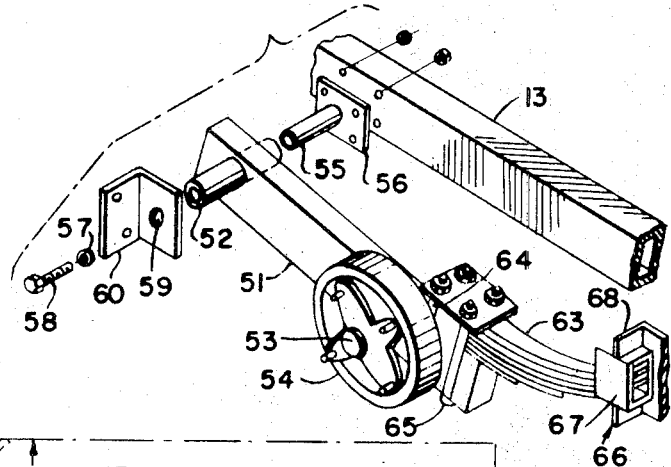
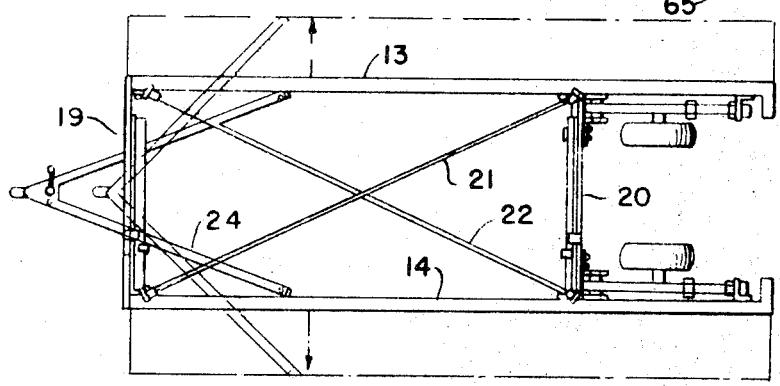

FRAME ASSEMBLY FOR MOBILE STRUCTURES

BACKGROUND OF THE INVENTION

This application is a continuation of application Ser. No. 35,764, filed May 8, 1970 now abandoned, and entitled FRAME ASSEMBLY FOR MOBILE STRUCTURE.

This application relates broadly to the class of wheeled structures or vehicles and is directed particularly to an improved mobile building structure.

While the present invention is applicable to a movable or mobile building of any type, it is especially directed to an improved mobile garage structure.

When traveling by automobile an occasion may arise when it is desirable to have a building structure or a garage structure in which the motor vehicle may be temporarily left for protection from the elements or against vandalism. Further, the mobile building structure may be used for parking boats or may be used as an office, a cabin, or for storage of various items. Also, the mobile building structure may be backed over lumber, motors and other items which are already in place in order to protect such items from the elements or from theft or vandalism and the like.

OBJECTS OF THE INVENTION

It is an object of the present invention to provide a wheeled housing or building structure which can be easily towed by a motor vehicle and which may be employed for housing or enclosing the motor vehicle when it may be desirable to leave the vehicle in one place for any length of time.

Another object of the invention is to provide a unique frame assembly for the mobile building structure which may be readily attached to and removed from the building structure for transporting the building structure to a particular destination.

A further object of the present invention is to provide a frame assembly for a mobile structure wherein the frame may be left on the mobile structure once it reaches its destination for bracing the mobile structure or which may be removed from the mobile structure and returned for credit or for a refund thereby making the cost of the mobile structure less since the cost to the manufacturer of making an additional frame for each mobile structure is eliminated. The provision of a removable frame assembly accordingly results in increased production.

A still further object of the present invention is to provide a unique suspension system which can be left on the frame assembly and pivoted up out of contact with the ground when the frame is left assembled to the mobile structure or which can be removed from the frame and returned for credit or for a refund.

A specific object of the present invention is to provide a unique frame assembly for mobile structures wherein telescopically arranged cross-frame members are provided whereby the frame assembly may be collapsed for legal towing width and easy transportation upon the highways when the frame assembly is removed from a mobile structure.

BRIEF DESCRIPTION OF THE DRAWINGS

FIG. 4 is a top perspective view of the front cross-frame member and a portion of the side frame members with the frame shown in collapsed position.

FIG. 5 is a sectional view in elevation taken along the line 5—5 in FIG. 1 showing the manner in which the side frame members are attached to the framing of the mobile building structure.

FIG. 6 is an exploded perspective view of the unique suspension assembly according to the present invention.

FIG. 7 is a top plan view showing the frame assembly in its collapsed position in full lines and in its extended position in phantom lines.

DETAILED DESCRIPTION OF THE INVENTION

Figure 1:
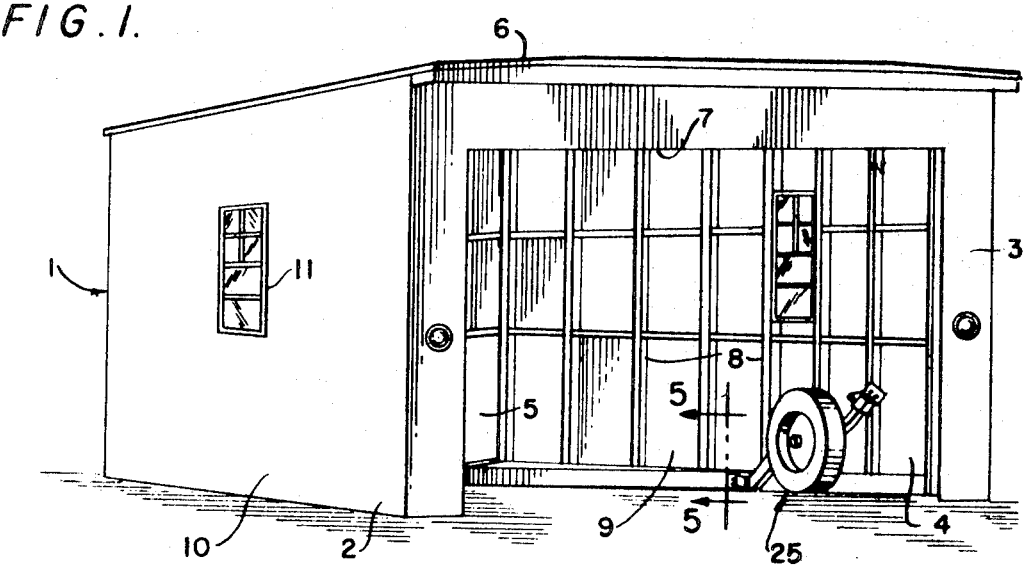
FIG. 1 is a perspective view of a mobile structure in accordance with the present invention, showing the suspension system pivoted upwardly with the bottom of the mobile structure resting upon the surface of the ground.

Referring now to the drawings wherein like reference numerals refer to like parts throughout the several views, a mobile structure according to the present invention is indicated generally at 1 and includes sidewalls 2, 3, 4 and rear wall 5, a roof 6 and an open bottom. Sidewall 3 includes an enlarged door opening 7 through which entry is gained to the interior of the structure.

The mobile structure itself is of conventional construction and is described more fully in U.S. Pat. No. 3,356,381, over which the present invention represents an improvement. Basically, the mobile structure includes a 2 inch by 4 inch wood stud framing, ½ inch cellotex type blackboard or wood insulation 9 and an aluminum outer covering 10. As shown in FIG. 1, the structure may be provided with windows 11 or the like.

Figure 2:
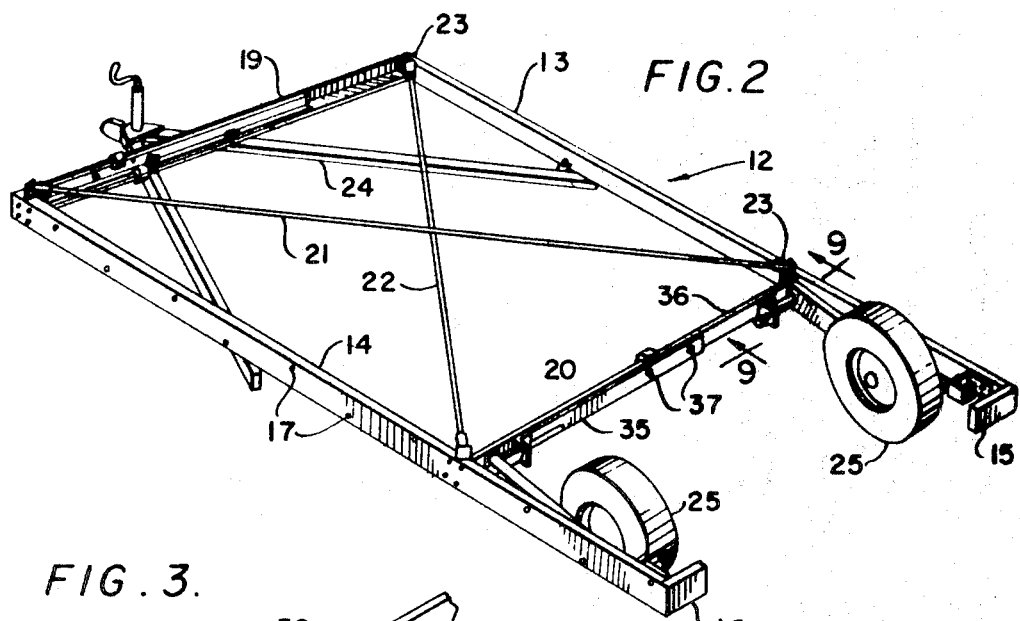
FIG. 2 is a top perspective view of the frame assembly and suspension assembly according to the present invention.
Figure 3:
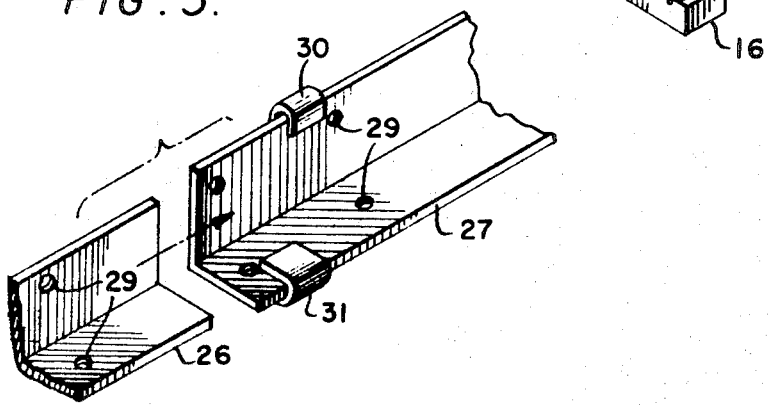
FIG. 3 is a detailed exploded perspective view of a portion of one of the cross-frame members showing the manner in which the cross-frame members may be telescoped relative to one another.

Referring now to FIG. 2, the frame assembly is indicated generally at 12 and comprises a pair of generally parallel, straight, rigid, one-piece side frame members 13 and 14, which may be made, for example, from a 2 inch by 6 inch by ¼ inch steel box beam. A relatively short laterally extending frame portion 15 and 16 is provided at the rear most end of each of the side frame members 13 and 14, respectively, for bracing the portions of the sidewall 3 at the opposite sides of door opening 7. Each of the side frame members 13 and 14 and frame portions 15 and 16 is provided with a plurality of predrilled holes 17 extending throughout the length thereof through which lag bolts 18 or the like are extended into the wood stud framing 8 of the mobile structure. A longitudinally adjustable telescopic front cross-frame member 19 is bolted at its opposite ends to one end of the side frame members 13 and 14, and a similar telescopic longitudinally adjustable rear cross-frame member 20 is bolted at its opposite ends to the side frame members intermediate the ends thereof. A pair of guy cables 21 and 22 are connected by means of draw bolts 23 adjacent the points of interconnection of the side frame members and cross-frame members for bracing the frame assembly during transportation. A hitch 24, more fully described hereinafter, is connected to the frame assembly for attaching the frame to a vehicle.

The suspension assembly 25 according to the present invention is connected to the frame assembly rearwardly of the cross-frame member 20, and is described in detail hereinafter.

As shown in FIG. 4, the front cross-frame member 19 comprises a pair of angle irons 26 and 27, shown telescoped together with the frame assembly in its collapsed position and with a plurality of bolts 28 extended through holes 29 in the opposite flange portions of the angle irons to hold them in adjusted telescoped relation. The angle iron 27 has a pair of guide tabs 30 and 31 welded on the edge of the flanges of the angle iron adjacent the end thereof for receiving the end of angle iron 26. Generally rectangular mounting brackets 32 and 33 are welded on the opposite ends of the cross-frame member 19 and have a pair of bolt-receiving holes 34 therethrough for bolting the cross-frame member to the side-frame members 13 and 14. Of course, the plates 32 and 33 could be eliminated if desired, and the ends of the side frame members received in the angle of the angle irons adjacent the end thereof and bolted thereto. The details of construction of the rear cross-frame member 20 are substantially the same as for the front cross-frame member 19 and will not be described in detail. It is sufficient to say the rear cross-frame member similarly comprises a pair of telescoped angle irons 35 and 36, having bolts 37 for securing the angle irons in position and guide tabs 38 for guiding and holding the telescoped angle irons together.

Figure 8:
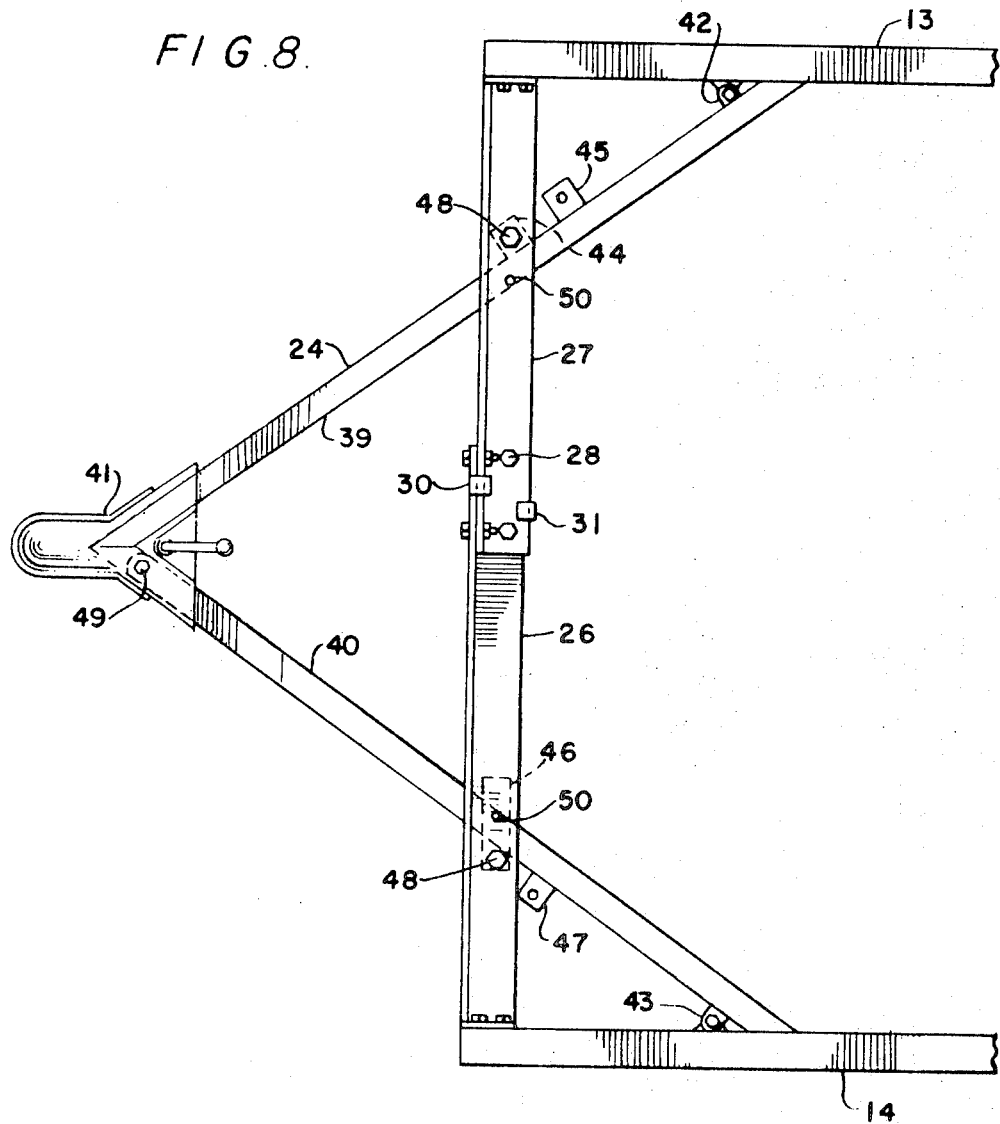
FIG. 8 is a top plan view of the unique pivoting hitch assembly for the frame assembly.

Referring now to FIG. 8, details of construction of the hitch assembly 24 and its relationship to the frame assembly can be seen. The hitch assembly comprises a pair of hitch booms 39 and 40 connected at one of their ends to a jack unit 41 and connected at their other ends to pivot assemblies 42 and 43 on the side-frame members 13 and 14, respectively. Each of the hitch booms 39 and 40 includes a pair of spaced mounting brackets 44, 45 and 46, 47 welded thereto intermediate the ends thereof for bolting the hitch booms to the front cross-frame member 19 in either the extended or collapsed position of the frame assembly. As seen in FIG. 8, the frame assembly is in its extended position and the hitch booms are bolted to the front cross-frame member 19 by means of bolts 48 or the like extended through a hole in the horizontal flange of the cross-frame member 19 and through the front brackets 44 and 46 on the hitch booms 39 and 40, respectively. When the frame assembly is collapsed by telescoping the angle irons 26 and 27 together to the position shown in FIG. 4, hitch boom 40 pivots about pivot bolt 49 to the position shown in full lines in FIG. 7. The bolts 48 are removed prior to collapsing the frame assembly and after the frame assembly has been collapsed to the position shown in FIG. 7, the bolts are placed through holes 50 in the horizontal flanges of the angle irons into brackets 45 and 47 on the hitch booms 39 and 40, respectively, to rigidify the hitch and frame assembly.

Figure 9:
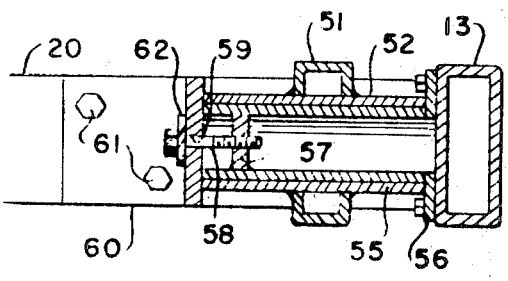
FIG. 9 is a sectional view in elevation of the pivot bearing for the suspension assembly and is taken along the line 9—9 in FIG. 2.

The details of construction of the suspension assemblies 24 can best be seen in FIGS. 6 and 9; and since the suspension assemblies are identically constructed, only one will be described. Referring particularly to FIG. 6, the suspension assembly comprises a swing arm 51 having a tubular suspension pivot bearing 52 welded in one end thereof and a hub spindle 53 welded into the othe end thereof with a hub 54 mounted on the spindle. A suspension pivot shaft 55 is received through the pivot bearing 52 and has a mounting bracket or plate 56 welded to one end thereof whereby the pivot shaft may be bolted to the side frame member 13. A washer 57 (FIG. 9) is welded internally of the pivot shaft 55 and has a threaded opening disposed centrally therein for threadably receiving a bolt 58 extended through an opening 59 in a suspension pivot bracket 60 which is bolted to the rear cross-frame member 20 by means of bolts 56. A washer 62 is disposed between the head of bolt 58 and the flange of suspension pivot bracket 60. The end of swing arm 51 on which the spindle and hub are mounted has a leaf spring assembly 63 clamped thereto by means of spaced U-bolts 64 and 65. One end of the leaf spring assembly 63 is received through an opening in a spring hanger 66 formed by welding a section of square tubing 67 into one flange of a spring hanger bracket 68 which is bolted to the side frame member so that by loosening the spring hanger 66 from the side frame member, the swing arm may be pivoted upwardly about the suspension pivot shaft to a position with the wheel mounted on the hub out of contact with the surface of the ground.

In use, the frame assembly as described herein is secured in its extended position as shown in FIG. 8 by means of the bolts 28 and is placed under a mobile structure such as a mobile garage as shown in FIG. 1. The frame is secured to the mobile structure by means of the lag screws 18, which are extended through the openings 17 in the side frame members into the wood studding 8 to hold the frame assembly and mobile structure together. The structure is then towed to its destination and, if desired, the frame may be removed from the mobile structure and returned to the seller or manufacturer for a refund or for credit.

If the frame is to be removed and returned, jacks are placed under the mobile structure, the lag screws 18 are removed and the frame is pulled out from under the mobile structure. Bolts 28 are then removed and the frame assembly is collapsed into the position shown in full lines in FIG. 7 for easy towing back to the seller or manufacturer. In its extended position, the frame is approximatley 12 feet wide and when in a collapsed position, is approximately 7½ feet wide.

Alternatively, if it is desired to leave the frame assembly on the building structure, the suspension assembly is simply pivoted upwardly as shown in FIG. 1. This is accomplished by loosening the spring hanger 66 from the side frame member and swinging the swing arm 51 and wheel upwardly about the suspension pivot shaft to the position shown in FIG. 1. If desired, the suspension assembly may be removed from the frame and returned to the manufacturer or seller for a refund or for credit by loosening both the spring hanger 66 and the suspension pivot bracket and suspension pivot shaft from the cross-frame member and side frame member, respectively.

The unique attachment of the hitch to the frame assembly enables the frame assembly to be collapsed and extended without requiring the use of a different or modified hitch when the frame assembly is in each of its respective positions. With the hitch of the present invention, it is necessary only to remove bolts 48 from the front cross-frame member and the brackets on the hitch booms in order that the hitch assembly may be pivoted about pivot bolt 49 to the collapsed position shown in FIG. 7.

All of the holes through the frame assembly for the various bolted connections are predrilled and accordingly, the frame assembly may be attached to and removed from a mobile building structure very easily and without requiring the use of special tools and the like.

As this invention may be embodied in several forms without departing from the spirit or essential characteristics thereof, the present embodiment is therefore illustrative and not restrictive.

What is claimed is:

1. A readily attachable and removable frame assembly for transporting a building structure, comprising, a pair of similar, relatively long, spaced apart, substantially parallel side frame members; a pair of longitudinally adjustable cross-frame members extending transversely to said side frame members and connected to said side frame members adjacent the opposite ends of the side frame members; separate and independent wheel means connected to each of said side frame members at opposite sides of said frame assembly intermediate the ends of the side frame members; a hitch means on said frame for towing said frame, said hitch means comprising two elongate hitch booms pivotally interconnected to each other at one end and pivotally connected at their other ends to the opposite sides, respectively, of said frame, and means on said frame assembly for readily removably attaching a building structure thereto.

2. A removable frame as in claim 1, wherein said cross-frame members include means for securing said cross-frame members at a predetermined adjusted position.

3. A removable frame as in claim 2, wherein each of said cross-frame members comprise a pair of angle irons telescopically engaged with one another.

4. A removable frame as in claim 3, wherein the angle irons of each cross-frame member are nested one within the other.

5. A removable frame as in claim 4, wherein one of said angle irons of said pair of angle irons in each cross-frame member has a pair of guide tabs on the opposite flanges thereof adjacent one end and the flanges of the other angle iron of said cross-frame member are received by said tabs to guide and maintain said angle irons in said nested relationship.

6. A removable frame as in claim 1, wherein each said wheel means is removably connected to said frame.

7. A removable frame as in claim 6, wherein each said wheel means is mounted on a suspension assembly, each said suspension assembly comprising an elongate swing arm, pivot means on one end of said elongate swing arm pivotally connecting said elongate swing arm at one end to said frame, and means on the other end of said elongate swing arm removably connecting said other end to said frame.

8. A removable frame as in claim 7, wherein each said wheel means is mounted adjacent the other end of a respective swing arm, and spring means is connected between said other end of each said swing arm and said frame resiliently supporting said wheel means relative to said frame means.

9. A removable frame as in claim 1, wherein said hitch means is removable from said frame.

10. A removable frame as in claim 3, wherein there is a front cross-frame member connected at its opposite ends to the respective ends of said side frame members and a rear cross-frame member connected at its opposite ends to the side frame members intermediate the ends thereof.

11. A removable frame as in claim 10, wherein said hitch booms are pivotally connected at their said other ends to respective ones of said side frame members intermediate the ends of said side frame members and means are on said hitch booms securing them intermediate their ends to said front cross-frame member.

12. A removable frame as in claim 11, wherein each said wheel means is mounted on a suspension assembly, each said suspension assembly comprising an elongate swing arm, means pivotally connecting one end of each said swing arm to said rear cross-frame member and a respective, adjacent side frame member, and spring means connected between said other end of each said swing arm and a respective one of said side frame members, each said wheel means comprising a hub and wheel assembly mounted to an associated swing arm adjacent said other end thereof.

13. A removable frame as in claim 12, wherein said means pivotally connecting each said swing arm to said cross-frame member and said side frame member comprises a tubular suspension pivot bearing in said one end of said swing arm, a suspension pivot shaft received through said pivot bearing and having a mounting bracket on one end thereof, said mounting bracket secured to said side frame member, and a suspension pivot bracket secured to said rear cross-frame member, the other end of said suspension pivot shaft secured to said pivot bracket.

14. A removable frame as in claim 13, wherein said pivot shaft is tubular and has means secured therein threadably receiving a bolt extended through said suspension pivot bracket into said tubular suspension pivot shaft to secure said pivot shaft to said rear cross-frame member.

15. A readily attachable and removable frame assembly for a building structure to render it mobile comprising a pair of elongate, substantially parallel, spaced apart, one-piece, rigid side frame members, an end cross-frame member connected at its opposite ends to said side frame members at one end thereof, an intermediate cross-frame member connected at its opposite ends to said side frame members intermediate the ends thereof, said side frame members each having a free end, said cross-frame members being longitudinally adjustable to effect changes in width of said frame assembly, a pair of wheel means connected to said frame assembly for movably supporting said frame assembly on a supporting surface, said wheel means supported inwardly of said frame members in the space between said intermediate cross-frame member and the free ends of said side frame members and selectively movable into and out of operative position relative to said supporting surface without interference with the building structure, the free ends of said side frame members turned inwardly toward one another and connectable to said building structure to rigidify and reinforce the building structure, a hitch means on said frame for towing said frame, said hitch means comprising two elongate hitch booms pivotally interconnected to each other at one end and pivotally connected at their other ends to the opposite sides, respectively, of said frame, and means for removably attaching said frame assembly to a building structure so that said frame assembly can be used to transport said building structure from one location to another location and then removed from said building structure or left thereon to serve as a frame for said building structure, as desired.

16. A readily attachable and removable frame assembly for a building structure to render it mobile comprising a pair of elongate, substantially parallel, spaced apart, one-piece, rigid, box beam side frame members, a pair of cross-frame members connected at their opposite ends to said side frame members, one of said cross-frame members connected to one end of said side frame members and the other cross-frame member connected to said side frame members intermediate the ends thereof, said side frame members extending beyond said other cross-frame member and each terminating in a free end, the free end of each side frame member turned inwardly a relatively short distance toward the other side frame member, said cross-frame members each comprising a pair of angle irons in nested longitudinally adjustable relationship to effect changes in width of said frame assembly, a pair of inturned tabs on opposite flanges of one of the angle irons in each cross-frame member engaged with the edges of the flanges of the other angle iron to hold and guide the angle irons in nested relationship, means on said angle irons to hold the angle irons in adjusted position, a pair of wheel suspension means connected to said frame assembly at opposite sides thereof for movably supporting said frame assembly on a supporting surface, said wheel suspension means each including an elongate swing arm pivotally connected at one end thereof to a removable pivot bracket means removably secured to said other cross-frame member and to an adjacent side frame member, a leaf spring means secured to the other end of said swing arm and to an adjacent side frame member adjacent the free end thereof, and wheel means secured to each swing arm adjacent the other end thereof, said wheel suspension means supported inwardly of said side frame members adjacent said other cross-frame member in the space between said other cross-frame member and the free ends of said side frame members and selectively pivotally movable into and out of operative position relative to said supporting surface without interference with the building structure, adjustable hitch means removably connected to said frame for towing said frame, said hitch means including a pair of elongate hitch booms pivotally connected together at one end thereof and each pivotally connected at the other end thereof to a respective side frame member, each said hitch boom releasably secured intermediate its ends to said one cross-frame member to rigidly the frame assembly and hitch means in both the collapsed and extended positions of the frame assembly, and means for removably attaching said side frame members, including the inturned ends thereof, to a building structure so that said frame assembly can be used to transport said building structure from one location to another location and then removed from said building structure or left thereon to serve as a frame for said building structure, as desired.

* * * * *